United States Patent [19]
Cser

[11] Patent Number: 4,974,568
[45] Date of Patent: Dec. 4, 1990

[54] RESONANCE SYSTEM WITH VARIABLE GEOMETRY FOR THE FRESH-GAS CONDUIT FOR INTERNAL COMBUSTION ENGINES.

[75] Inventor: Gyula Cser, Budapest, Hungary

[73] Assignee: Autóipari Kutató és Fejlesztó Vállalat, Budapest, Hungary

[21] Appl. No.: 418,815

[22] Filed: Oct. 4, 1989

[30] Foreign Application Priority Data

Oct. 18, 1988 [HU] Hungary ............................. 5333/88

[51] Int. Cl.$^5$ ............................................. F02M 35/10
[52] U.S. Cl. ................................................. 123/52 MB
[58] Field of Search .......... 123/52 M, 52 MB, 52 MC, 123/52 MV

[56] References Cited

U.S. PATENT DOCUMENTS

| | | | |
|---|---|---|---|
| 4,064,696 | 12/1977 | Cser | 123/52 M |
| 4,353,211 | 10/1982 | Cser et al. | 123/52 M |
| 4,513,699 | 4/1985 | Cser | 123/52 MB |
| 4,565,166 | 1/1986 | Takeda | 123/52 MB |
| 4,622,926 | 11/1986 | Rutschmann et al. | 123/52 MB |
| 4,625,686 | 12/1986 | Kubis | 123/52 MB |
| 4,630,575 | 12/1986 | Hatamura et al. | 123/52 M |
| 4,838,215 | 6/1989 | Yasuda et al. | 123/52 MB |
| 4,858,569 | 8/1989 | Cser et al. | 123/52 MB |

FOREIGN PATENT DOCUMENTS

| | | |
|---|---|---|
| 1935155 | 2/1970 | Fed. Rep. of Germany . |
| 2245732 | 11/1982 | Fed. Rep. of Germany . |
| 3232366 | 5/1983 | Fed. Rep. of Germany . |
| 2949790 | 11/1983 | Fed. Rep. of Germany . |
| 3544122 | 9/1987 | Fed. Rep. of Germany . |
| 0115818 | 9/1981 | Japan ............................. 123/52 MB |
| 59-22249 | 7/1984 | Japan . |
| 0173520 | 10/1984 | Japan ............................. 123/52 MB |
| 0088862 | 5/1985 | Japan ............................. 123/52 MB |

*Primary Examiner*—David A. Okonsky
*Attorney, Agent, or Firm*—Spencer & Frank

[57] ABSTRACT

An internal combustion engine includes an engine cylinder having a suction opening; a piston arranged in the engine cylinder for reciprocating motion therein; a fresh-gas conduit system for supplying the cylinder with fresh gas; and a resonance system forming part of the fresh-gas conduit system. The resonance system includes a resonance vessel having a resonance vessel outflow opening communicating with the suction opening of the engine cylinder and a plurality of resonance pipes each having one end provided with a pipe inflow opening for fresh gas and an opposite end provided with a pipe outflow opening for fresh gas merging into the resonance vessel. The resonance system further has a closing element having an open and a closed position for allowing and, respectively, preventing flow of fresh gas through one of the resonance pipes to connect the last-named resonance pipe to and, respectively, disconnect it from the resonance system for changing a resonance frequency of the resonance system.

5 Claims, 4 Drawing Sheets

RESONANCE SYSTEM WITH VARIABLE GEOMETRY FOR THE FRESH-GAS CONDUIT FOR INTERNAL COMBUSTION ENGINES.

BACKGROUND OF THE INVENTION

The invention relates to a resonance system with variable geometry for the fresh-gas conduit of internal combustion engines, by the aid of which filling ability of the resonance system can be improved and kept on the most optimal level even with several selected rotational speeds of the engine.

Fresh-gas conduits of internal combustion engines have been formed frequently as resonance systems, by the aid of which—in particular at low rotational speed of the engine—filling of the cylinders of the engines can be increased. Similar solutions are specified in the Patents DE-PS Nos. 1 935 155 and 2 245 732.

Solutions are also known where the resonance system consisting of the a resonance vessel and of at least one resonance pipe forms only an essential element of the fresh-gas conduit and is completed with other elements increasing filling (changing) of the cylinders. Such an element may be the suction pipe resulting in filling the suction pipe, as as disclosed, for example, in the Patent DE-PS No. 3 544 122.

Application of the resonance systems has been also known, with which not all the resonance systems built-in into the fresh-gas conduit are communicating with the suction openings of the cylinders of the engine. Such a system functioning as a so-called blind resonance system, improves filling of the cylinders (see German Patent DE-PS No. 2 949 790.

Independent of the character of assembly, the common feature of the resonance systems lies in that the most efficient filling activity can be achieved only at a defined rotational speed of the engine. In case of deviating from this value, efficiency drops. Even the r.p.m. range resulting in a still acceptable improvement does not include the complete operative r.p.m. range of the internal combustion engines. So it is quite obvious that there is a tendency to change number of revolutions—so-called r.p.m of resonance—at which a resonance system is able to yield the most advantageous effect.

In consideration that natural frequency of the oscillation of the fresh-gas flowing in the resonance system can be defined, in addition to the sound velocity of the medium, by the geometric dimensions of the resonance system, that is the resonant volume /$V_R$/, the length of the resonance pipe (L) and by the cross-section of the resonance pipe (f), by properly selecting these dimensions the desired r.p.m of resonance can be achieved.

Character of the resonant volume is described in the German Patent DE-PS No. 3 232 366. According to this specification, the resonant volume comprises the volume of the resonator vessel, the volume of the suction channels interconnecting the resonance vessel and the suction openings of the cylinders and the average cylinder volume communicating with the resonator vessel during one oscillating period of the fresh air.

Solutions are also known, with which an expediently chosen regulator is changing continuously the volume of the resonance vessel and thus the resonant volume in compliance with requirements.

In other cases, as e.g. in accordance with the specification of the utility model JA-U2-5922249 the length of the resonance pipe is varied in order to shift resonance frequency.

A solution is also known, where the resonance vessel is connected to two resonance pipes, of which one pipe can be opened or closed with a closing device. This type is specified in the German Patent DE-PS No. 3 544 122; by this solution it becomes possible to change simultaneously the cross-section of the resonance pipe and the effective pipelength.

Common deficiency of all known solutions lies in that geometric dimensions of the resonance system can be changed so and to such an extent which suffices exclusively for changing the natural frequency of the fresh-gas flowing in the system. These solutions yield satisfactory results in acoustic oscillating systems, in which oscillating process is taking place at inconsiderable gas velocities. These solutions, however, these cannot be used efficiently with the resonance system of internal combustion engines, because in these systems—to achieve improved filling—simultaneously with pressure oscillations gas flow of considerable velocity may be observed. Accordingly, proper selection of the natural frequency of oscillations represents a necessary but insufficient condition for a satisfactory operation.

The aim of the invention is to change the geometry of the resonance system to such an extent, that not only the natural frequency can be changed in compliance with requirements, but additionally optimal function of the resonance system can be assured even with oscillations with a changed natural frequency.

The invention is based on the recognition that when using two parallel-connected resonance pipes built into the fresh-gas conduit of internal combustion engines for improving filling, three geometric characteristics (namely resonance volume, length and cross-section of the resonance pipe) affecting the resonance frequency of the resonance system can be changed with one single closing element which changes the resonant volume by disconnecting one of the pipes. It is noted that the resonant volume does not only include the volume of the resonance vessel, but the sum of all connected volumes, in which pressure change occurs essentially simultaneously, whithout phase shift and phase lag.

Accordingly, the invention provides a resonance system with variable geometry in the fresh-gas conduct of reciprocating internal combustion engines having a resonance vessel provided with an outflow opening communicating with the suction opening of the engine cylinder, more than one resonance pipes discharge into said vessel, of which one, or in a controlled way connected in parallel, a plurality of pipes form free flow cross-section of the fresh gas and a closing element connects to or disconnects from the resonance vessel a volumetric element by closing the cross-section of the resonance pipe, thus changing the resonance frequency of the resonance system.

With the most simple embodiment of the invention the closing element is arranged in the pipe-end lying opposite to the end of one of the resonance pipes discharging into the resonance vessel. With this embodiment, in particular, if the shortest one of the pipes of different length is closed, the resonance pipe loses its pipe character and assumes a volumetric character, so the volume of the resonance pipe is to be added to the volume of the resonance vessel, when calculating resonant volume.

By closing or opening the resonant volume will change, so cross section of throughflow of the resonance pipe, through which fresh-gas is flowing into the engine, in case of resonance pipes of different length, the active length of the resonance pipe is changing too. It goes without saying that by the closing or opening first of all the resonance frequency is changing.

Accordingly, the natural frequency of the system can be adjusted to two separately chosen rotational speed of the engine and in such a manner, that at both selected natural frequencies, a gas velocity—sufficing for improved filling—arises in the open resonance pipes, enabling throughflow. The magnitude of the resonant volume changes accordingly. In such a manner for both r.p.m of resonance an advantageous volumetric ratio determined by the pneumatic oscillating system can be assured, namely between the resonant volume—(which is analogous to a pneumatic "spring")—and the volume of the resonance pipe, (which is analogous to) the "mass" consisting of the pneumatic medium.

According to a further preferred embodiment of the invention, the closing element is arranged in the resonance vessel. In its closed position that part of the volume of the resonance vessel will be disconnected, into which one of the resonance pipes opens.

According to a further preferred embodiment of the invention, the closing element is arranged in the equalizing vessel. In the closed position of the closing element that part of the volume of the equalizing vessel will be disconnected, into which one of the resonance pipes opens. It is noted that the equalizing vessel is connected to the pipe-end lying opposite to the end of the pipes connected to the resonance vessel. The equalizing vessel has an inflow opening for the fresh gas.)

By the application of the solution according to the invention it can be achieved that the resonance system assures maximal filling not only at a certain rotational speed, i.e. frequency, but it shows a similar efficiency in increasing the filling (charging) factor at another number of revolution.

In such a manner it can be achieved that at both r.p.m. of resonance requirements can be met which result in an efficient operation, namely gas velocity of satisfactory magnitude prevails in the resonance pipe delivering predetermined kinetic energy, at the same time, the co-operating resonant volume is also changing. That means that at both r.p.m. of resonance the system may be rendered optimal for improved filling of the cylinders, while known solutions are set optimally to one single resonance frequency only, which may be shifted within one range or displaced, abandoning an optimal operation for lack of proper conditions.

In case of the solution according to the invention, length and/or cross section of three resonance pipes communicating with the resonance vessel are not necessarily identical. This can be achieved so that by actuating the closing organ, i.e. by opening or closings the cross section, efficient length and volume of the resonance pipes and simultaneously the resonant volume change.

Practically this means, that to every single selected natural frequency (r.p.m. of resonance) which can be adjusted by changing geometric dimensions/conditions, any other conditions can be established, such as a given velocity of fresh-gas at the prevailing r.p.m. of resonance the, ratio of volumes etc. which guarantee optimal efficiency of the resonant system.

BRIEF DESCRIPTION OF THE DRAWING

The invention will be described in detail by means of preferred embodiments for three-cylinder and, four-cylinder, four-stroke engines, with reference to the drawings enclosed, wherein.

DESCRIPTION OF THE PREFERRED EMBODIMENTS

Figure 1:
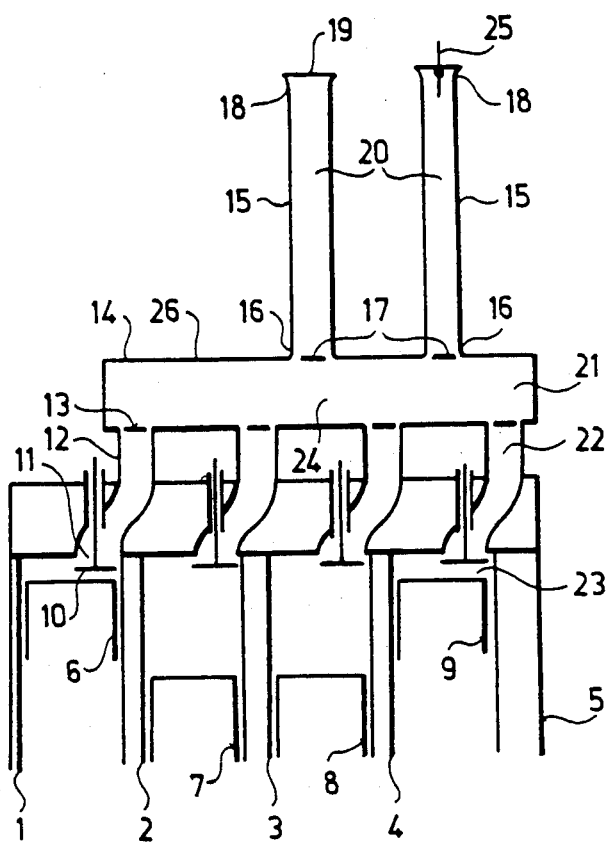
FIG. 1 illustrates the first embodiment with the closing element in one of the resonance pipes.

In FIG. 1, the four-stroke four-cylinder internal combustion engine 5 with the cylinders 1, 2, 3, 4 is arranged in line, pistons 6, 7, 8, 9 are fitting into the aforementioned cylinders. Order of sequence of ignition is as usual, that means that cylinders 1, 3, 4, 2 are following in ignition, as it becomes obvious from the figure. Ignition space equals to 180°, and in course of the suction strokes the openings of suction valves do not overlap each other to a significant extent. FIG. 1 does not illustrate exhaust valves. Suction valves 10 close suction openings 11, which are connected to suction channels 12 and interconnect suction opening 11 with the outflow cross-section 13 of the a resonance vessel 14. Suction channels 12 are communicating separately with the resonance vessel 14. Two parallel connected resonance pipes 15 open with their ends 16 into the resonance vessel 14, onto the inflow cross-section 17. The length of the two resonance pipes 15 is identical, and the inflow cross-sections 19 of the other ends 18 are identical with the area of the inflow-cross-section 17 of the resonance vessel 14.

In the fresh-gas conduit system 26 the volumes 20 of the resonance pipes is as the "mass" carriers of the fresh-gas forming the resonance system, are adapted to the resonant volume 24—forming the "spring" of the resonance system—composed of the volume of the resonance vessel 14, the volume 22 of the suction channels 12 and the volumes 23 of the cylinders 1 to 4, formed as an average volume communicating with the resonance vessel 14 during the period of oscillation. The pneumatic resonance system has a resonance frequency defined by the length of the two parallel-connected resonance pipes 15, the common cross section of throughflow (the double of the inflow cross section 19), common volumes 20 and the resonant volume 24, which is tuned to the average r.p.m. of the engine, improving filling of the cylinders.

The first resonance pipe 15 has always a constant inflow cross section 19, this represents cross-section of throughflow, and at the end 18 of the second resonance pipe 15, in the inflow cross section 19 a closing element is arranged in form of a butterfly valve 25.

By means of actuating means (not illustrated here), the butterfly valve 25 is connected to the unit regulating/controlling the closing element and the engine 5. Essentially, the butterfly valve 25 may assume two positions, namely a completely open and a completely closed position. An intermediate position also exists, if evenness of the output/r.p.m. change of the engine requires such a position.

In the closed or open position of the butterfly valve 25 geometric dimensions of the system 26 are different; dimensions are changed by means of the butterfly valve 25.

In the closed position of the butterfly valve 25 there is no flow through the second resonance pipe 15; a free inflow cross-section 19 exists exclusively in the first resonance pipe 15. Accordingly, oscillating "mass" of the pneumatic resonance system is formed by the air quantity filling the volume 20 of a single resonance pipe 15, and, accordingly, the magnitude of the resonant volume 24 is also changing, as it is completed with the volumetric element connected thereto, namely the volume 20 of the second resonance pipe 15, that means, that the air filling the space acts as a "spring" whose, springing effect is softened.

Similarly to the volume 22 of the suction channels 12, the volume 20 of the closed resonance pipe 15 also forms a part of the resonant volume. Since these all have the character of a vessel, change of air pressure therein takes place without delay, and in the individual elements separate oscillations do not occur. In the closed position of the butterfly valve 25, at a low engine speed fresh air flows through one single inflow cross-section 19, and thus, in spite of the reduced engine speed, the flow velocity suffices to put into oscillation—by means of the kinetic energy—the pneumatic soft spring enclosed by the resonant volume 24. This second r.p.m. of resonance may be chosen for the number of revolutions lying below the torque maximum of the engine 5, while the first r.p.m. of resonance may be chosen for the number of revolutions lying above the torque maximum, the purpose being that the engine 5 should have a torque of approximately constant magnitude in an r.p.m. range that is as wide as possible. By the fact, that the butterfly valve 25 is closing one of the resonance pipes 15, a volumetric element, that is the volume 20 of the resonance pipe 15 will be connected to the resonance vessel 14, so that the resonance system will have two resonance frequencies. Although, operationally no separation can be effected, structurally it becomes possible to assemble the engine 5 with the suction channels 12, while the fresh-gas conduit system 26 may form a separate system consisting of the resonance vessel 14, the resonance pipes 15 and the butterfly valve 25.

From the following examples it becomes obvious which structural elements can be coupled to the ends 18 of the resonance pipes 15 to assure supply of the fresh air.

Figure 2:
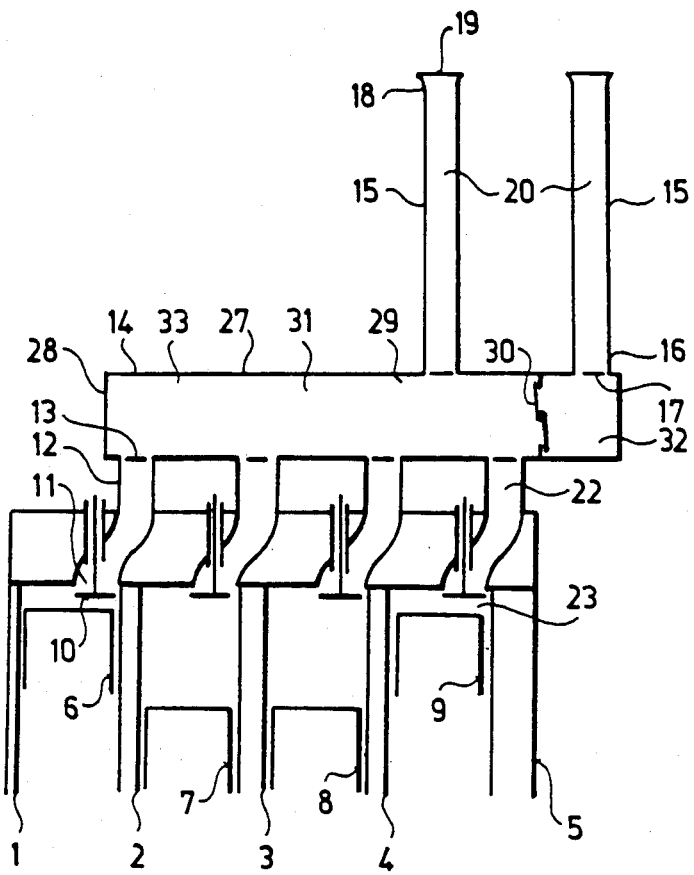
FIG. 2 is the second embodiment with the closing element in the resonance vessel.

FIG. 2 shows the version of the invention, wherein the closing element is arranged in the resonance vessel.

The engine 5—which is connected to the conduit system 27 delivering fresh air—is the same as in the first embodiment, illustrated in FIG. 1. The system 27 has two parallel connected resonance pipes 15 communicating with the resonance vessel 28 being in connected to the suction channels 12. The whole volume 29 of the resonance vessel 28 is divided into two space-parts by the butterfly valve 30—as the closing element—arranged therein, namely into the main volume 31 and the auxiliary volume 32. All the suction channels 12 open into the main volume 31, while the end 16 of the second resonance pipe 15 with the cross section 17 opens into the auxiliary volume 32. The lengths and cross sectional are as 17 of the two resonance pipes 15 are identical By an actuating means (not illustrated here) the butterfly valve 30 is connected to the regulating/controlling unit for the control of the engine 5 and the closing element.

Essentially, the butterfly valve 30 may assume two positions, namely the fully open position and the fully closed position. An intermediate position too, is feasible if needed for controlling the evenness of the change of the output or speed of the engine 5.

In the closed position of the butterfly valve 30 there is no throughflow through the second resonance pipe 15, which opens into the auxiliary volume 32; exclusively the inflow cross section 19 or throughflow in the first resonance pipe 15 is free. Accordingly, the oscillating "mass" of the pneumatic resonance system is formed by the air filling the volume 20 of one single resonance pipe 15, and accordingly the magnitude of the resonant volume 33 is also changing as a volumetric element—namely the space-part, into which one of the resonance pipes 15 opens—was reduced by disconnecting the auxiliary volume 32. In such a manner the pneumatic "spring" will be harder.

This embodiment is considered as most advantageous in cases wherein cross sections 19 of the two resonance pipes 15 are different and in the first resonance pipe 15, due to the larger volume a larger air quantity is present, representing a larger "mass" than the air in the second resonance pipe with the smaller cross section 19.

In the open position of the butterfly valve 30 the flow is allowed to stream freely in both resonance pipes 15, and accordingly, the oscillating "mass" of the pneumatic resonance system is formed by the combined air quantity filling the volume 20 of the resonance pipe 15, while the "spring" of the resonance system is formed by the resonant volume 33, comprising the complete volume 29 of the resonance vessel 28, the volumes of the suction channels 12 and the average volume of the volumes of the cylinders 1 to 4 communicating with the resonance vessel 28 during the period of oscillation.

It is expedient to reduce the volume 29 of the resonance vessel 28 by closing or opening the butterfly valve 30, when it is intended to approach the two r.p.m. of resonances.

Figure 3:
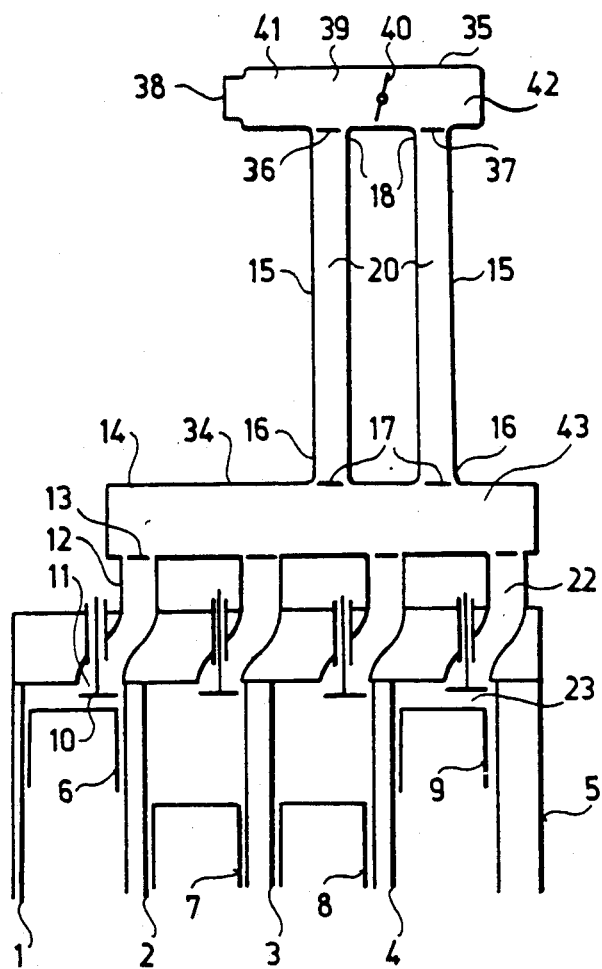
FIGS. 3 and 4 show the third and fourth embodiment with which the closing element is arranged in the buffer (damping) vessel connected to the inflow cross sections of the resonance pipes.

FIG. 3 illustrates the a third preferred embodiment of the invention, in which the closing element is arranged in the buffer vessel.

The engine 5 connected with the fresh-gas conduit system 34 is identical with the engine according to the embodiment of FIG. 1. The system 34 is provided with two parallel-connected resonance pipes 15, the resonance vessel 28 with the suction channels connected thereto and the buffer vessel 35. The openings 36, 37 of the buffer vessel 35 are fitted to the inflow cross section 19 of the ends 18 of the resonance pipes 15. The buffer vessel 35 has an inflow opening 38 for the fresh gas. The volume 39 of the buffer vessel 35 is divided in two parts by the closing element formed as a butterfly valve 40, namely into the space 41 with unhindered throughflow and the connected space 42, while the unit (not illustrated here) for regulating/controlling the output or rotational speed of the engine 5 is connected to or disconnected from the space 41 with the unhindered throughflow.

Essentially, the butterfly valve 40 may assume two positions, namely the fully open and fully closed position; an intermediate position too, is feasible if needed for controlling the evenness of the change of the output or the rotational speed of the engine 5.

In the open position of the butterfly valve 40 the fresh gas is allowed to stream freely in both resonance pipes 15, and accordingly, an oscillating "mass" of the pneumatic resonance system is formed by the combined air quantity filling the volume 20 of both resonance pipes, while the "spring" of the resonance system is formed by the resonant volume 43, formed of the average volume communicating with the resonance vessel 14 during the period of oscillation and composed of the volume 21 of the resonance vessel 14, the volume 22 of the suction channels 12 and the volumes 23 of the cylinders 1 to 4. The pneumatic resonance system has a resonance frequency defined by the length of the parallel-connected two resonance pipes 15, the combined cross section of throughflow, the combined volumes 20 and the resonant volume 43, and its tuned to an average rotational speed of the engine, improving filling of the engine.

In the closed position of the butterfly valve 40 there is no free throughflow through the second resonance pipe 15 connected to the space 42; there is a free inflow cross section 19 only in the first resonance pipe 15 where thus the fresh gas is allowed to stream freely. In such a manner the oscillating "mass" of the pneumatic resonance system is formed by the air being present in the volume 20 of a single resonance pipe 15, and the magnitude of the resonant volume 43 changes accordingly. This is so, because there are added, by coupling, two volumetric elements namely the volume 20 of the second resonance pipe 15 and as a partial space the volume of the connected space 42. In such a manner the pneumatic "spring" will be softer. As a consequence, resonance frequency and so r.p.m. of the engine, with which filling of the cylinders is improved by the pneumatic resonance system, lies at the lowest r.p.m. range.

In case of the presently described embodiment the buffer vessel 35 does not play a functional role as a member of the pneumatic resonance system. The buffer vessel 35 is one member of the unti (not illustrated here) of the engine 5, provided with an air-filter and supplying fresh air, and its task is to produce a space with uniform pressure at the inflow cross section 19 of the resonance pipes 15. The opening 38 of the buffer vessel 35 also serving for the introduction of fresh air, is connected to the turbo-charging pressure delivery conduit, e.g. of an exhaust gas turbine (not illustrated here).

Figure 4:
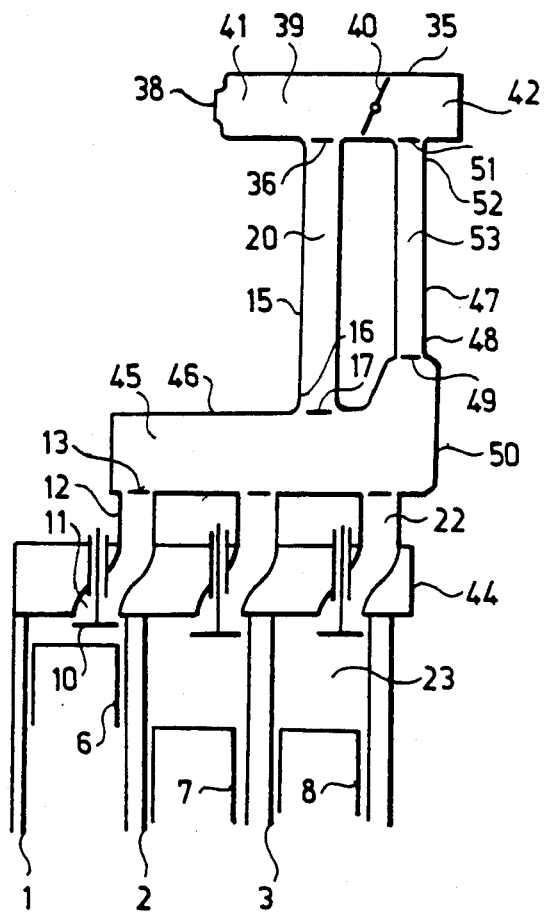

In FIG. 4 a fourth preferred embodiment according to the invention is illustrated, wherein the closing element is arranged in the buffer vessel. The engine is a three-cylinder four-stroke engine.

Pistons 6, 7, 8 are fitting into the cylinders 1, 2, 3 of the three-cylinder engine 44. The sequence of ignition is as usual: the cylinders 1, 3, 2 are ignited in accordance with the symbols of the figure.

Firing sequence amounts to 240°, and the openings of the suction valves 10 in course of suction—strokes do not overlap each other. FIG. 4 does not illustrate the exhaust valves.

Suction valves 10 are closing the suction openings 11 which communicate with the suction channels 12 and interconnect the suction openings 11 with the outflow cross section 13 of the resonance vessel 46 of the fresh-gas supplying system 45. Two parallel-connected resonance pipes open into the resonance vessel 46, the end 16 of the resonance pipe 15 opens into the inflow cross section of the resonance vessel 46, the end 48 of the shorter resonance pipe 47 opens into the inflow cross section 49, which is arranged in the dome 50 of the resonance vessel 46.

The other end 18 of the resonance pipe 15 communicates permitting an outflow opening 36 of the space 41 with the unhindered throughflow, while the end 52 of the resonance pipe 47 with the volume 53 is connected to the outflow opening 51 of the connected space 42 of the buffer vessel 35. Space 41 of the buffer vessel 35 and the connected space 42 are separated from each other by means of the butterfly valve 40. The resonance pipe 47 is shorter than the resonance pipe 15, and the cross-sectional area—being identical with the opening 51—is smaller than that of the resonance pipe 15. Accordingly the volume 53 is smaller than the volume 20 of the resonance pipe 15.

The fourth embodiment seen in FIG. 4 corresponds to the third embodiment, however, this solution provides a structural solution for choosing the ratio of the resonance r.p.m.'s.

Multi-cylinder motors, in which groups with four or three cylinders can be formed, the single groups of cylinders can be provided with separate fresh-gas conduits. Resonance pipes of the resonance vessels of the groups with two or more cylinders may be connected to a common buffer vessel, wherein the resonance system will function in resonance, in case the volume-parts of the buffer vessel connected to the groups of resonance pipes are well separated from each other. This is, expediently realized with a valve, whereby by opening the valve, airspaces belonging to the resonance pipes of different resonance vessels can be made to communicate with one another in the buffer vessel to obtain ranges differing from the ranges of the resonance r.p.m.'s.

I claim:

1. In an internal combustion engine including an engine cylinder having a suction opening; a piston arranged in said engine cylinder for reciprocating motion therein; a fresh-gas conduit system for supplying the cylinder with fresh gas; a resonance system forming part of the fresh-gas conduit system and including a resonance vessel having a resonance vessel outflow opening communicating with said suction opening and a plurality of resonance pipes each having one end provided with a pipe inflow opening for fresh gas and an opposite end provided with a pipe outflow opening for fresh gas merging into said resonance vessel; the improvement wherein said resonance system comprises a closing element having an open and a closed position for allowing and, respectively, preventing flow of fresh gas through one of said resonance pipes to connect said one resonance pipe to and, respectively, disconnect said one resonance pipe from the resonance system for changing a resonance frequency of said resonance system.

2. An internal combustion engine as defined in claim 1, wherein said closing element is disposed in said pipe inflow opening of said one resonance pipe.

3. An internal combustion engine as defined in claim 1, wherein said closing element is disposed in said resonance vessel and further wherein in said closed position said closing element separates said resonance vessel into a first vessel part and a second vessel part; said pipe outflow opening of said one resonance pipe merging into said first vessel part; said resonance vessel outflow opening being provided solely in said second vessel part.

4. An internal combustion engine as defined in claim 1, further comprising a buffer vessel having a buffer vessel inflow opening for fresh gas; said pipe inflow openings merging into said buffer vessel; said closing element being disposed in said buffer vessel and in said closed position said closing element separating said buffer vessel into a first vessel part and a second vessel part; said pipe inflow opening of said one resonance pipe merging into said first vessel part.

5. An internal combustion engine as defined in claim 2, wherein said resonance vessel and said one resonance pipe have respective inner volumes; further wherein the inner volume of said one resonance pipe is situated between said closing element and said pipe outflow opening of said one resonance pipe for maintaining communication unchanged between the inner volume of said one resonance pipe and the inner volume of said resonance vessel independently from the positions of said closing element.

* * * * *